United States Patent
Jin et al.

(10) Patent No.: US 7,693,052 B2
(45) Date of Patent: Apr. 6, 2010

(54) METHOD AND APPARATUS FOR NETWORK CONGESTION CONTROL USING QUEUE CONTROL AND ONE-WAY DELAY MEASUREMENTS

(75) Inventors: Cheng Jin, Pasadena, CA (US); Steven H. Low, La Canada, CA (US); David X. Wei, Pasadena, CA (US); Bartek Wydrowski, Altadena, CA (US); Ao Tang, Pasadena, CA (US); Hyojeong Choe, Gyeonggi-do (KR)

(73) Assignee: California Institute of Technology, Pasadena, CA (US)

( * ) Notice: Subject to any disclaimer, the term of this patent is extended or adjusted under 35 U.S.C. 154(b) by 1197 days.

(21) Appl. No.: 11/206,445

(22) Filed: Aug. 17, 2005

(65) Prior Publication Data
US 2006/0050640 A1    Mar. 9, 2006

Related U.S. Application Data

(60) Provisional application No. 60/605,458, filed on Aug. 30, 2004, provisional application No. 60/602,987, filed on Aug. 19, 2004, provisional application No. 60/602,111, filed on Aug. 17, 2004.

(51) Int. Cl.
*G01R 31/08* (2006.01)
(52) U.S. Cl. .................................... 370/230
(58) Field of Classification Search ......... 370/229–240
See application file for complete search history.

(56) References Cited

U.S. PATENT DOCUMENTS

| | | | |
|---|---|---|---|
| 5,063,562 A | 11/1991 | Barzilai et al. | |
| 5,974,028 A | 10/1999 | Ramakrishnan | |
| 7,020,083 B2 | 3/2006 | Garcia-Luna-Aceves et al. | |
| 2002/0150048 A1* | 10/2002 | Ha et al. ................... | 370/231 |
| 2002/0154602 A1* | 10/2002 | Garcia-Luna-Aceves et al. ................... | 370/230 |
| 2003/0137938 A1* | 7/2003 | Belanger et al. .......... | 370/230 |
| 2004/0133391 A1* | 7/2004 | Bovo et al. ................. | 702/178 |
| 2004/0225916 A1* | 11/2004 | Clark ......................... | 714/25 |
| 2005/0018617 A1 | 1/2005 | Jin et al. | |
| 2005/0021821 A1 | 1/2005 | Turnbull et al. | |
| 2005/0259577 A1 | 11/2005 | Sin | |
| 2005/0286416 A1* | 12/2005 | Shimonishi et al. ........ | 370/229 |

(Continued)

OTHER PUBLICATIONS

Rene L. Cruz, A Calculus For Network Delay, Part I: Network Elements In Isolation, IEEE Transactions On Information Theory, vol. 37, No. 1, Jan. 1991, pp. 1-18.

(Continued)

*Primary Examiner*—Kwang B Yao
*Assistant Examiner*—Tung Q Tran
(74) *Attorney, Agent, or Firm*—Morgan, Lewis & Bockius LLP

(57) ABSTRACT

The invention provides a congestion control scheme that is a delay based scheme that includes a scalable queue size and one-way queueing delay measurement to reduce network congestion. Queue size is managed by queue control, a scalable utility function, dynamic alpha tuning, and/or randomized alpha tuning. One-way queueing delay is accomplished by measuring backward queueing delay management using various methods of estimating the receiver clock period. Embodiments include estimating the receiver clock period using single sample and multiple sample periods. The system includes a method for detecting route change.

5 Claims, 9 Drawing Sheets

U.S. PATENT DOCUMENTS

2006/0050640 A1 3/2006 Jin et al.
2007/0121506 A1 5/2007 Wydrowski et al.

OTHER PUBLICATIONS

Jacobson & Karels, Congestion Avoidance And Control, Sigcomm 1988, Nov. 1988, pp. 1-25.
Joana Kulik et al., A Simulation Study Of Paced TCP, NASA-CR-2000-209416, pp. 1-25.
Sanjay Hedge et al., Fast TCP in High Speed Networks: An Experimental Study, Proceeding of Gridnets, Oct. 29, 2004, San Jose CA, pp. 1-9.
Floyd & Jacobson, Random Early Detection Gateways For Congestion Avoidance, IEEE/ACM Transactions On Networking, Aug. 1993, pp. 1-22.
Wei & Low, A Burstiness Control For FastTCP, Caltech Whitepaper, www.cs.caltech.edu/~weixl/research/icnp.pdf, Jun. 9, 2004, pp. 1-24.
Choe & Low, Stabilized Vegas, Caltech Whitepaper, http://netlab.caltech.edu/FAST/papers/svegas_allerton02.pdf, Oct. 2002, pp. 1-19.
PCT US05/29329, International Search Report, pp. 1-7, which corresponds to copending U.S. Appl. No. 11/206,445.
PCT US06/17793, International Search Report, pp. 1-10, which corresponds to copending U.S. Appl. No. 11/382,213.
PCT US06/17793, Written Opinion, pp. 1-5, which corresponds to copending U.S. Appl. No. 11/382,213.
USPTO Office Action, U.S. Appl. No. 10/868,564 (copending case).
Response by Applications to USPTO Office Action, U.S. Appl. No. 10/868,564 (copending case).
S.Floyd et al., Modifying TCP's Congestion Control for High Speeds, May 5, 2002, http://citeseer.ist.psu.edu/cache/papers/cs/28676/http:zSzzSzwww.icir.orgzSzfloydzSzpaperszSz.
M.Handley, et al., TCP Friendly Rate Control (TFRC): Protocol Specification, University of Manheim, Jan. 2003.
S.Floyd et al., Equation-based congestion control for unicast applications, Proc.ACM SIGCOMM'00, May 2000, http://www.icir.org/tfrc/tcp-friedly.pdf.
S.Floyd et al, A comparison of equation-based and AIMD congestion control, May 12, 2000, http://www.icir.org/tfrc/aimd.pdf.
D.Bansal et al., Dynamic Behavior of Slowly Responsive Congestion Control Algorithms, Sigcomm'01 , http://www.icir.org/tfrc/aimd.pdf.
L. Brakmo et al., TCP Vegas: end-to-end congestion avoidance on a global Internet, IEEE Journal on Selected Areas in Communications, 13(8):1465-80, Oct. 1995.
L. Brakmo et al., TCP Vegas: New Techniques for Congestion Detection and Avoidance, Feb. 16, 1994, http://www.icir.org/tfrc/aimd.pdf, Univ. of Arizona.
M.Gerla et al., TCP Westwood: Congestion Window Control Using Bandwidth Estimation, http://www.cs.ucla.edu/NRL/hpi/tcpw/tcpw_papers/TCPWGlobecomBasicPaperFinalDraft.pdf, 200.
C.Casetti et al, TCP Westwood: End-to-end congestion control for wired/wireless networks, Wireless Networks Journal, 8:467-479, 2002.
T.Kelly, Scalable TCP: Improving performance in highspeed wide area networks, Computer Communication Review, 32(2), Apr. 2003; http://www-lce.eng.cam.ac.uk/~ctk21/scalable/.
G.Vinnicombe, On the stability of networks operating TCP-like congestion control, Proc. of IFAC World Congress, 2002, http://www-control.eng.cam.ac.uk/gv/internet/ifac.pdf.
F.Paganini et al, Congestion Control for High Performance, Stability and Fairness In General Networks, Apr. 4, 2003, http://www.ee.ucla.edu/~paganini/PDF/Papers/fast-jour.pdf.
C.Jin, D.X. Wei, and S.H. Low, TCP Fast: motivation, architecture, algorithms, performance. Proceedings of IEEE Infocom, Mar. 2004, http://netlab.caltech.edu.
F.Paganini et al., Scalable laws for stable network congestion control, Proc. Conference on Decision and Control, Dec. 2001,http://www.ee.ucla.edu/~paganini.
F.Paganini, Z.Wang, S.Low, J.Doyle, A new TCP/AQM for stable operation in fast networks, www.ee.ucla.edu/~paganini/PDF/Papers/fast-infocom03.pdf.
R.Jain, A delay-based approach for congestion avoidance in interconnected heterogeneous computer networks, ACM Computer Communication Review}, 19(5):56-71, Oct. 1989.
Z.Wang, J.Crowcroft, Eliminating periodic packet losses in the 4.3-Tahoe BSD TCP congestion control algorithm, ACM Computer Communications Review, Apr. 1992.
E. Weigle et al., A Case For TCP Vegas in High-Performance Computational Grids, 10th IEEE Int'l Symposium on High Performance Distributed Computing, Aug. 7-9, 2001, HPDC 2001.
R. Wang et al., Using Adaptive Rate Estimation to Provide Enhanced and Robust Transport Over Heterogeneous Networks, 10th IEEE Int'l Conf on Network Protocols, 2002, pp. 206-215.
S.Jin, L.Guo, I.Matta, A.Bestavros, A spectrum of TCP-friendly window-based congestion control algorithms, IEEE/ACM Transactions on Networking, 11(3), Jun. 2003.
D.Katabi, M.Handley, C.Rohrs, Congestion control for high-bandwidth delay product networks, Proc. ACM Sigcomm, Aug. 2002, http://www.ana.lcs.mit.edu/dina/XCP/.
R.Shorten et al., Analysis and design of congestion control in synchronised communication networks,Jun. 20, 2003, http://www.hamilton.ie/net/synchronised.pdf.
A.Kuzmanovic, E.Knightly, TCP-LP: A distributed Algorithm For Low Priority Data Transfer, Proc. IEEE Infocom, 2003, http://networks.rice.edu/papers/KuzKni03.pdf.
A.Aggarwal, S.Savage, and T.Anderson, Understanding the performance of TCP pacing, Proceedings on INFOCOM 2003, pp. 1157-1165, Mar. 2000.
Parsa & Aceves, Improving TCP Congestion Control over Internets with Heterogeneous Transmission Media, UC Santa Cruz White Paper, Jan. 25, 2000, pp. 1-15.
Wu-Chang Feng, Improving Internet Congestion Control and Queue Management Algorithms, U. of Michigan White Paper, 1999, pp. 1-143.
Cheng Jin et al., Fast TCP: From Theory To Experiments, IEEE 0890-8044/05, IEEE Network, Jan./Feb. 2005, pp. 1-8.
Extended European Search Report, Application No. 05789228.3, dated May 18, 2009, 6 pgs.
Jin, C., et al., "Fast TCP for High-Speed Long-Distance Networks (Internet Draft)," Internet Engineering Task Force, Jun. 2003, 8 pgs.

* cited by examiner

METHOD AND APPARATUS FOR NETWORK CONGESTION CONTROL USING QUEUE CONTROL AND ONE-WAY DELAY MEASUREMENTS

CROSS-REFERENCE TO RELATED APPLICATION(S)

The present application claims the benefit of priority from U.S. Provisional Patent Application No. 60/605,458, entitled "Methods to Improve Delay Based TCP", filed on Aug. 30, 2004, which is herein incorporated by reference in its entirety, and to U.S. Provisional Patent Application No. 60/602,987 entitled "Fast TCP Queue Control", filed on Aug. 19, 2004, which is herein incorporated by reference in its entirety, and to U.S. Provisional Patent Application No. 60/602,111 entitled "Method for Measuring One-Way Delay Changes for TCP/IP Networks", filed on Aug. 17, 2004, which is incorporated by reference in its entirety.

The U.S. Government has certain rights in the invention pursuant to Grant Nos. ANI-0113425, ANI-0230967, ANI-0113425 and ANI-0230967 awarded by the National Science Foundation.

BACKGROUND OF THE INVENTION

1. Field of the Invention

The present invention relates to the field of networks and to methods and apparatus for congestion control.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

Computer networks allow communication between one or more computers. Networks include local area networks (LANs), wide area networks (WANs), the Internet, wireless networks, mixed device networks, and others. One limitation to the efficient use of networks is network congestion, when the number of message sources and destinations, and the amount of message traffic, is greater than the network can handle efficiently. In the prior art, such congestion problems are handled by implementing congestion control.

Congestion control is a distributed algorithm to share network resources among competing users. It is used in situations where the availability of resources and the set of competing users vary over time unpredictably, yet efficient sharing is desired. These constraints, unpredictable supply and demand and efficient operation, have been solved in the prior art by using feedback control. Feedback control, also referred to as "closed loop" control, involves the use of some metric to determine dynamic and typically real-time adjustment of a system to provide optimum results. Such systems are distinguished from so called "open loop" control systems where there is no feedback (for example, cooking a turkey without using a meat thermometer is open loop and using a meat thermometer is a closed loop feedback system).

In this prior art approach, traffic sources dynamically adapt their rates in response to congestion in their paths. An example of a network that uses feedback control as a congestion control is the Internet (using Transmission Control Protocol (TCP) in source and destination computers involved in data transfers). Note that although we discuss the Internet, the present application applies to other networks as well.

The congestion control algorithm in the current TCP, also known as "Reno", was developed in 1988 and has gone through several changes since. Current research predicts that as bandwidth-delay product continues to grow, TCP Reno will eventually become a performance bottleneck. In other words, the very control system used to manage congestion will lead to inefficient use of the network even as the network (Internet) continues to offer higher bandwidth and performance. The following four difficulties contribute to the poor performance of TCP Reno in networks with large bandwidth-delay products.

1. At the packet level, linear increase by one packet per Round-Trip Time (RTT) is too slow, and multiplicative decrease per loss event is too drastic. Current schemes use this "speed up slowly/slow down quickly" approach to packet traffic control and it is not effective in high bandwidth systems.
2. At the flow level, maintaining large average congestion windows requires an extremely small equilibrium loss probability, and maintaining such a small loss probability is not practical in prior art systems.
3. At the packet level, oscillation is unavoidable because TCP uses a binary congestion signal (packet loss).
4. At the flow level, the dynamics are unstable, leading to severe oscillations that can only be reduced by the accurate estimation of packet loss probability and a stable design of the flow dynamics. Current systems do not allow for accurate enough estimation of packet loss.

SUMMARY OF THE INVENTION

The invention provides a congestion control scheme that is a delay based scheme that includes a scalable queue size and one-way queueing delay measurement to reduce network congestion. Queue size is managed by queue control, a scalable utility function, dynamic alpha tuning, randomized alpha tuning, and equation-based alpha tuning. One-way queueing delay measurement is accomplished by measuring backward queueing delay using various methods of estimating the receiver clock period. Embodiments include estimating the receiver clock period using single sample and multiple sample periods. The system includes a method for detecting route change.

DETAILED DESCRIPTION OF THE INVENTION

Figure 1:
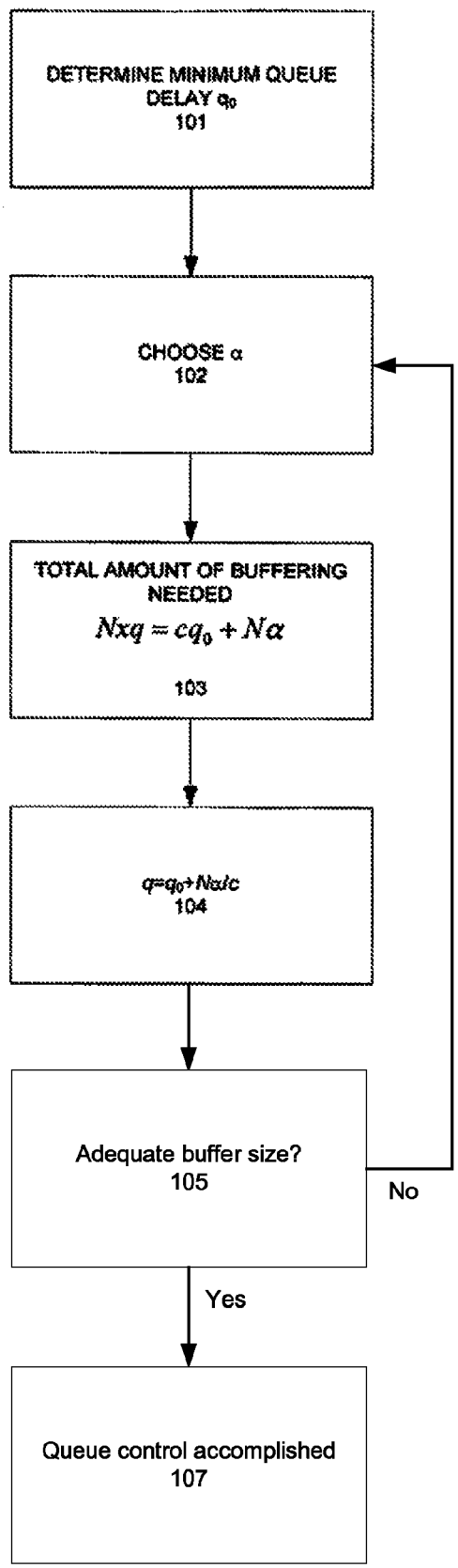
FIG. 1 is a flow diagram illustrating an embodiment of queue control in the invention.

A method and apparatus for congestion control is described. In the following description, numerous details are set forth in order to provide a more thorough description of the present invention. It will be apparent, however, to one skilled in the art, that the present invention may be practiced without these specific details. In other instances, well known features have not been described in detail so as not to unnecessarily obscure the present invention.

The present invention is a delay based model and in fact uses queueing delay as a congestion measure, providing advantages over prior art loss based systems. One advantage is that queueing delay can be more accurately estimated than loss probability. This is because packet losses in networks with large bandwidth-delay product are rare events under TCP Reno and its variants (probability on the order $10^{-7}$ or smaller), and because loss samples provide coarser information than queueing delay samples. Indeed, measurements of delay are noisy, just as those of loss probability. Thus, another advantage of the present invention is that each measurement of queueing delay provides multi-bit information while each measurement of packet loss (whether a packet is lost) provides only one bit of information for the filtering of noise. This makes it easier for an equation-based implementation to stabilize a network into a steady state with a target fairness and high utilization. In addition, the dynamics of queueing delay provides scaling with respect to network capacity. This helps maintain stability as a network scales up in capacity. One delay based scheme is described in U.S. patent application Ser. No. 10/868,564 filed on Jun. 14, 2004 and entitled "Method and Apparatus for Network Congestion Control", assigned to the assignee of the present invention and fully incorporated by reference herein. The technique described in the cited and incorporated patent application is referred to herein as "Delay Based TCP".

The present invention addresses buffer overflow conditions and queueing delay measurement techniques. First, buffer overflow conditions are discussed.

As noted in the above cited application, one of the parameters that is used to determine the equilibrium of the state of the connection is $\alpha$. In equilibrium, each connection maintains a total of $\alpha$ packets in the intermediate router buffers. In one embodiment, $\alpha$ is set to 200 on Gigabit networks to overcome noisy delay measurements so that a single flow may fully utilize a high speed link that is not shared. However, when a large number of high volume flows are trying to share a link, a buffer overflow may occur before the flows reach equilibrium. When there are N flows, then $N\alpha$ amount of memory is needed to provide the necessary buffering. However, the amount of buffer memory available on the network is not always sufficient to satisfy such a need. When buffer size is inadequate, overflow occurs and packet loss is the result.

The invention proposes a number of methods to address buffer overflow when the buffer capacity is too small or the number of flows is too large. These techniques include queue control, scalable utility function, dynamic $\alpha$ tuning, randomized a tuning, and equation-based alpha tuning.

Alpha tuning ensures that Delay Based TCP flows will have high utilization and very little packet losses in networks with varying (and perhaps unknown) buffer limits. For example, in some scenarios, a network may not have sufficient buffering to support a large number of Delay Based TCP flows. Without alpha tuning, all Delay Based TCP flows would suffer continuous packet losses. Alpha tuning can help each Delay Based TCP choose an appropriate alpha value and permit the network to reach equilibrium.

Queue Control

The Delay Based TCP has a parameter a that is the sum of its own packets queued at each bottleneck router in its path in equilibrium (there may be more than one bottleneck router in a flow's path). The queue-control technique allows Delay Based TCP to use a smaller a value while at the same time being robust against noisy delay measurements. Mathematically, the number of packets queued is expressed by the equilibrium condition $$\text{Number of packets queued} = x \cdot q = \alpha$$

where x is the throughput achieved and q the measured round-trip queueing delay. Hence, the value $\alpha$ determines the equilibrium queueing delay q. In practice, $\alpha$ must be chosen large enough so that the resulting queueing delay q is above the noise level in delay measurement. For example, we typically choose $\alpha$ so that the queueing delay is at least 5 ms when there is a single flow in the network.

A large $\alpha$ however may create a problem when the number of flows sharing the same network is large. Since $\alpha$ is the minimum amount of buffering necessary to accommodate packets from a Delay Based TCP flow to avoid packet loss, when there are N flows, indexed by i=1, 2, . . . , N, with parameters $\alpha_i$, then the total buffering requirement is $$\text{Network buffering requirement} = \sum_i x_i q_i = \sum_i \alpha_i$$

In the special case where all flows use the same parameter value, i.e., $\alpha_i = \alpha$ for all I=1, . . . N, then $$\text{Network buffering requirement} = \sum_i x_i q_i = \sum_i \alpha_i = N\alpha$$

From this equation, a small $\alpha$ is desired so that the buffering requirement grows slowly with N.

Hence, there may be a dilemma where a large $\alpha$ is needed for robustness against noise in delay measurement but a small $\alpha$ is needed to minimize the network buffering requirement. Queue control is a technique to reconcile these conflicting objectives.

In describing an embodiment of queue control, we assume that all flows have the same parameter value, i.e., $\alpha_i = \alpha$ for all i. FIG. 1 is a flow diagram illustrating an embodiment of the queue control scheme of the invention.

An embodiment of the invention modifies the equilibrium condition described above to:

$$x \cdot (q - q_0) = \alpha;$$

where $q_0$ is the minimum queueing delay (e.g. 5 ms) we wish to maintain on each end-to-end path in order t6 be robust against error in delay measurement (step 101). Beyond $q_0$, each Delay Based TCP connection will contribute $\alpha$ packets. By including a minimum delay $q_0$, we can then choose a to be small so that the buffering requirement $N\alpha$ grows slowly with N. For example, $\alpha$ can be chosen to produce a queueing delay as small as 0.5 ms, even for Gigabit networks (as opposed to 5 ms). To see this clearly, note that for a single link with capacity c shared by N=1 flows with a common parameter a, the throughput $x=c/N$. Hence the queueing delay, from the revised equilibrium condition described above, is given by:

Measured queueing delay=$q=q_0+N\alpha/c$ (step 104).

By including a minimum delay $q_0$, the measured queueing delay q can still be large enough compared with noise level even if we choose a small $\alpha$ at step 102 (and even when N=1). The total amount of buffering when there are N (elephant) flows is Network buffering requirement=$Nxq=cq_0+N\alpha$ (step 103)

Hence, a small $\alpha$ results in a slower growth of buffering requirement in N (at the expense of incurring a nonzero minimum buffering requirement of $cq_0$).

In summary, from step 104, we see that queueing delay will always include at least a minimum queueing delay $q_0$, regardless of the number of flows N. If we choose $q_0$ to be, for example, 5 ms, then the buffer needs to accommodate a constant 5 ms (independent of N) of queueing delay plus $N\alpha$. Since $q_0$ already provides immunity to noise in delay measurement, $\alpha$ can be chosen to be very small, giving a much slower growth of buffering requirement in N from step 103. Thus, given a fixed buffer size inside a network, this queue control technique allows a larger number of concurrent Delay Based TCP flows. At step 105 it is determined if the $\alpha$ chosen results in adequate buffer size for the number of flows N, for example, by observing full link utilization and the absence of packet loss. If so, then queue control is accomplished at step 107. If not, another $\alpha$ value is chosen at step 103.

One Delay Based TCP window update algorithm when queueing delay is $q_k$ at time k is:

$$w_{k+1} = \frac{1}{2}\left(\frac{w_k}{d+q_k} \cdot d + \alpha + w_k\right)$$

here $w_k$ and $w_{k+1}$ are the window sizes at time k and k+1, respectively, and d the propagation delay or baseRTT. With queue control applied, the window update algorithm becomes:

$$w_{k+1} = \frac{1}{2}\left(\frac{w_k}{d+q_k} \cdot (d+q_0) + \alpha + w_k\right)$$

The new equilibrium may be interpreted as each Delay Based TCP seeing a modified baseRTT measurement that is elevated by $q_0$ compared to the true baseRTT measurement. It can be shown that, with errors in baseRTT measurement, the Delay Based TCP algorithm still solves a utility maximization problem.

Scalable Utility Function

A second technique generalizes the observation that queue control modifies the utility function of Delay Based TCP. This embodiment modifies the utility function to result in a controlled or slowed growth of buffer requirements with the number of paths N on a link for any of a plurality of values of $\alpha$. Consider the equilibrium condition $q=u(x)$ where u(x) is a marginal utility function. The equilibrium backlog for N identical flows sharing a single link of capacity c=Nx is then $B(N)=Nxq=cu(x)=cu(c/N)$ Since u is a decreasing function, total backlog B(N) increases with N, but we can choose u to control the growth of u(c/N) in N. One Delay Based TCP scheme has $u(x)=\alpha/x$ and hence $B(N)=\alpha N$, which is linear in N. To reduce the growth rate of B(N) in N, we can choose $u(x)=\beta\log(\bar{x}/x)$ where $\bar{x}$ is the peak rate and $\beta$ is some positive constant that can be tuned for specific environment. Then $B(N)=cu(c/N)=c\beta \log N+c\beta \log(\bar{x}/c)$ This results in a slower logarithmic, as opposed to linear, growth of B(N) as N increases. An advantage of the scalable utility function is that it can use a number of values of $\beta$ and still controls buffer overflow. For instance, if we take $\beta=5$ ms, then $c\beta$ is a buffer capacity that can accommodate 5 ms of queue. Note that B(N) grows logarithmically in N.

Once a scalable marginal utility function u(x) is chosen, the window adjustment can take the form:

$w_{k+1}=w_k+\gamma(u(x_k)-q_k)$

It should be noted that other functions of u(x) besides the log function can be used to obtain a slow growth of B(N) with N. Indeed, u(x) can be any positive decreasing function with a sub-linear rate of decrease. One such example is:

$u(x)=\beta(\sqrt{\bar{x}}-\sqrt{x})$ where $\bar{x}$ is the peak rate. Then $B(N)=c\beta(\sqrt{\bar{x}}-\sqrt{c/N})$ i.e. B(N) grows like $\sqrt{N}$ rather than linearly with N.

Finally, one can combine the technique of queue-control described in the previous section and that of scalable utility function described above to prevent buffer overflow. For instance, combining $u(x)=\alpha/x$ with queue control technique, we obtain a new marginal utility function: $u(x)=\alpha/x+q_0$. For this method, the buffering requirement is $B(N)=cu(c/N)=cq_0+\alpha N$.

With $u(x)=\beta \log(\bar{x}/x)+q_0$, the buffering requirement is $B(N)=cu(c/N)=c\beta \log N+c\beta(q_0+\log(\bar{x}/c))$ Hence, with minimum queueing delay $q_0$, we can choose $\beta$ to be very small, and the growth in B(N) will be on the order $c\beta \log N$. Although the log function is used here, other functions may be used instead without departing from the scope and spirit of the invention. For example, a square root function may be used.

Dynamic $\alpha$ Tuning

Figure 2:
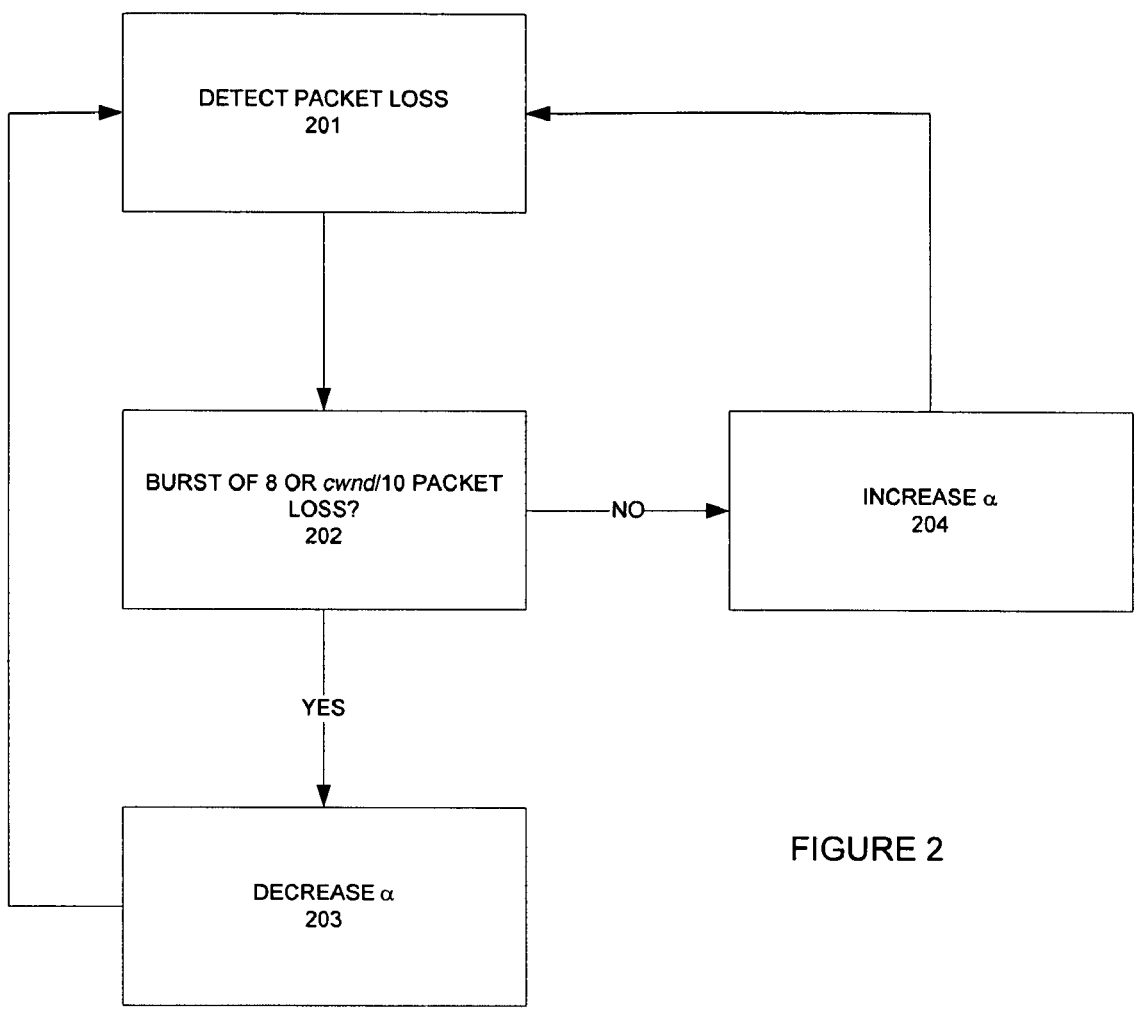
FIG. 2 is a flow diagram illustrating an embodiment of dynamic α tuning.

This technique tries to dynamically adapt $\alpha$ on a slow timescale, and in a distributed manner. An embodiment of this technique is illustrated in the flow diagram of FIG. 2. Instead of queueing delay, this embodiment uses packet loss (step 201) as a signal to control $\alpha$ in each host machine. For every congestion loss event (e.g. a burst of at least 8 or cwnd/10 packet losses in each RTT) observed by the host machine (step 202), the algorithm reduces $\alpha$ by an amount (step 203) proportional to its current value (multiplicative decrease, or MD). In each control interval, the algorithm increases $\alpha$ by a constant value (additive increase, or AI) (step 204). In other words, $\alpha$ is increased slowly but decreased quickly in response to an embodiment of this technique (referred to as AIMD). In practice, $\alpha$ is adjusted to within a pre-specified range and there is a cap on the size of each adjustment.

The AIMD approach is used in controlling congestion window in loss based algorithms. Here, it is used for tuning a in a delay-based algorithm. With this technique, fairness and efficiency can be achieved without global cooperation.

Prior art loss based congestion control algorithms suffer from noise in packet loss. This becomes very noticeable in high-speed long distance networks and wireless networks. These algorithms react to packet loss by reducing the congestion window. In the scenarios where random packet loss dominates, the algorithms work poorly by continuing to reduce congestion window while random packet loss should not require such a change.

Instead of using packet loss as congestion signal, this embodiment tries to use a congestion loss event as a signal for tuning α. A congestion loss event is defined as an event in which packets are dropped due to congestion. In contrast, a random packet loss is an event in which packets are dropped due to random link error and other non-congestion effects. TCP congestion control algorithms should react to congestion loss events only. From measurements, multiple packet loss appears usually in congestion loss event. A single packet loss usually appears in random loss event. The invention utilizes certain parameters to determine a congestion loss event.

P=8 packets: the threshold for congestion loss event detection. If there are P or more than P packet losses in one window, the detection algorithm assumes the packet loss is due to congestion. P should be a positive i n t e g e r.

counter: the counter for packet loss detected in the current window (non-negative integer)

cwnd: congestion window (from the congestion control algorithm, which is an input variable for this algorithm)

The parameter P can be a linear function of congestion window cwnd. That is, P=cwnd/k where, for example, k≧100. That means the packet loss event is only detected as a congestion loss event when one out of every k packets is lost. Such variation may be useful in connections in a wireless network, where the random loss rate may be high.

Figure 6:
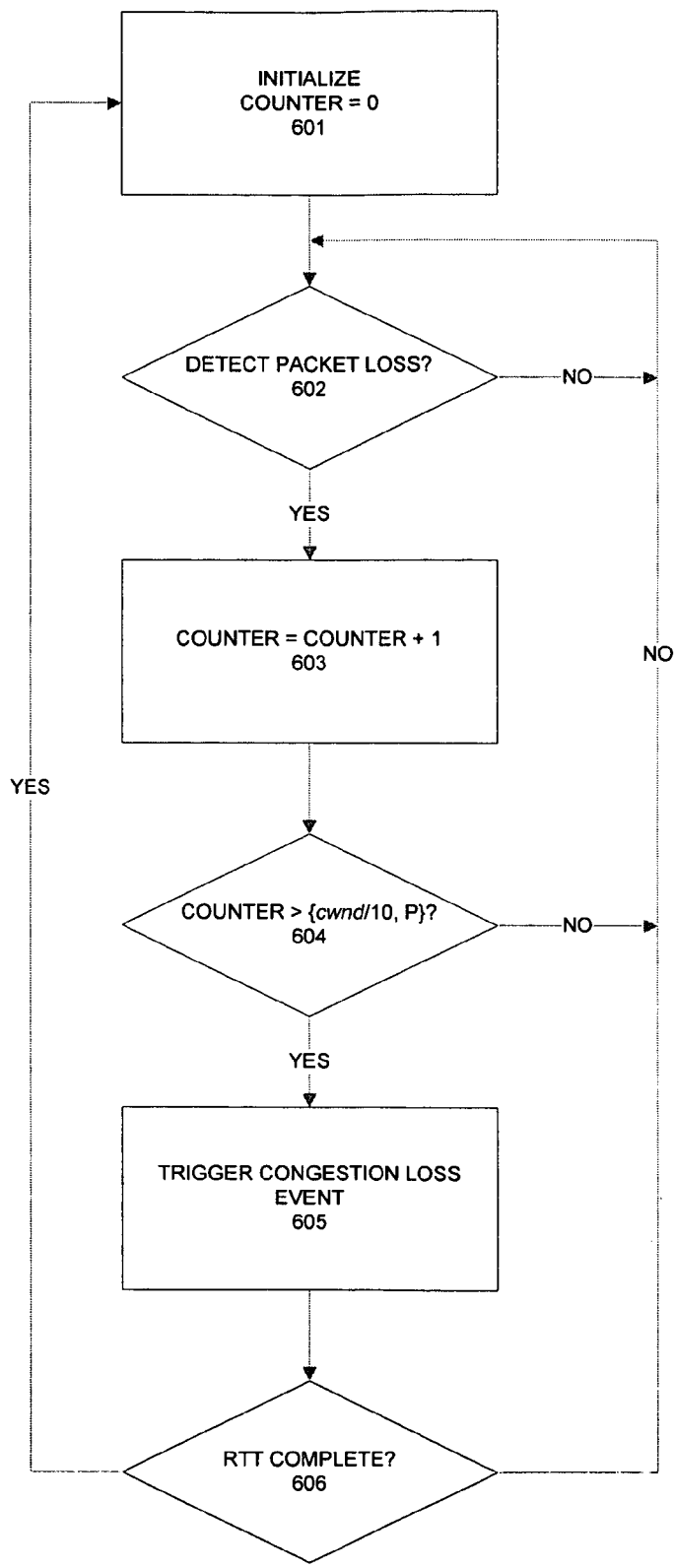
FIG. 6 is a flow diagram illustrating detection of a congestion loss event in one embodiment of the invention.

FIG. 6 is a flow diagram illustrating the operation of one embodiment of the congestion loss event detection of the invention. At step 601 the system is initialized and the counter is set to 0. At decision block 602 it is determined if a packet loss has been detected. If not, the system returns to checking for a packet loss. If yes, the counter is incremented (e.g. by 1) at step 603.

At decision block 604 it is determined if the counter is above a threshold value. In the embodiment described (by way of example) the counter is checked to see if its value is greater than {cwnd/10, P}. If not, the system cycles back to step 602. If yes, a congestion event is triggered at step 605. At decision block 606 it is determined if the current RTT is complete. If not, the system returns to step 602. If yes, the counter is reset to zero at step 601.

Adaptive Algorithm

An embodiment of the invention provides an adaptive algorithm to control the value of α. The algorithm has the following parameters with suggested values:

T=20 (sec): regular control interval. It should be larger than the largest RTT;

A=1 (packet): the increment value of a for each control interval. It should be a positive integer;

B=⅛: the decrement fraction of α for each congestion loss event. It should be within (0,1);

β=½: the upper-bound of decrement fraction of α for each control interval. It should be within (B,1) and within (0,1);

$\underline{\alpha}$=8: the lower-bound of α (example embodiment). It should be a positive integer;

$\bar{\alpha}$=200: the upper-bound of α (example embodiment). It should be a positive integer larger than $\underline{\alpha}$.

current_time: the real time from the local machine, which is an input variable for this algorithm;

next_update_time: the time for the next regular control event;

last_alpha: the α value right after the last regular control event.

Figure 7:
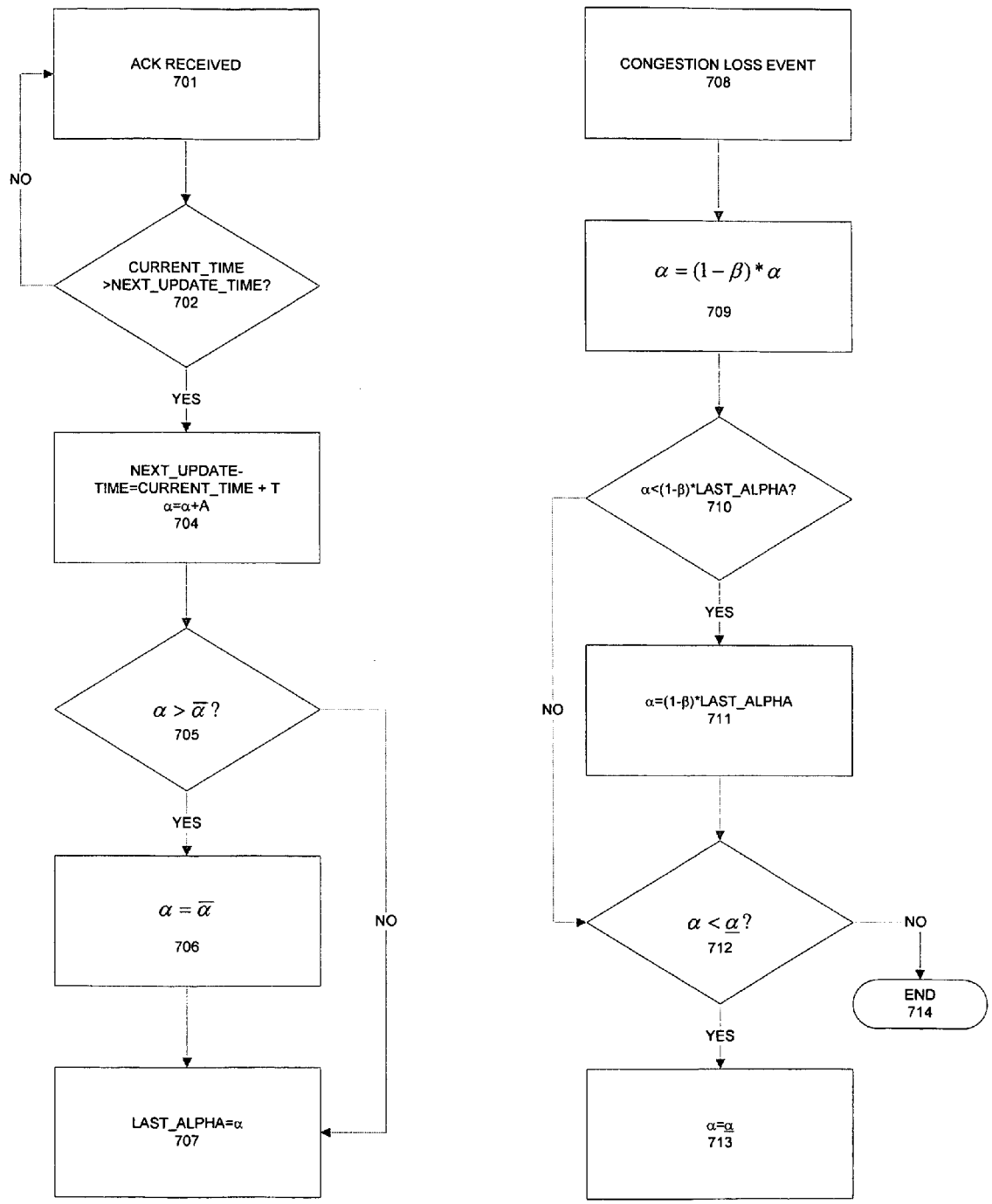
FIG. 7 is a flow diagram illustrating the adaptive algorithm of an embodiment of the invention.

FIG. 7 is a flow diagram illustrating the adaptive algorithm of this embodiment. The algorithm reacts differently depending on whether an ACK or a congestion loss event has occurred. The system initializes with next_update_time=current_time+T and last_alpha=α. For a received ACK at step 701 the system checks at decision block 702 to see if the current time is greater than the next update time. If not, the system waits for the next ACK. If so, it is time to update parameters. At step 704 the next_update_time is increased by T and α is set to α+A. At decision block 705 the value of a is checked to see if it exceeds the upper bound value $\bar{\alpha}$. If so, the value of α is set equal to $\bar{\alpha}$ at step 706. If not, the last_alpha value is set equal to the new a value at step 707. As can be seen from the operation of this algorithm, the alpha value is slowly increased as long as ACK signals are being received, up to the upper bound alpha value.

When a congestion event occurs at step 708, the alpha value is reduced at step 709 by setting α=(1−β)*α. At step 710 this value is checked to see if it is less than (1−β)*last_alpha. If so, then the alpha value is set equal to (1−β)*last_alpha at step 711. If the decision block 710 is false, or after step 711, the alpha value is checked at decision block 712 to see if it is less than the lower bound alpha value. If so, then the alpha value is set to the lower bound alpha value $\underline{\alpha}$. If not, proceed to end 714.

Route Change Detection

Delay Based TCP measures round-trip queueing delay by subtracting round-trip propagation delay (pRTT) from round-trip time (RTT), and the round-trip propagation delay is taken to be the minimum observed RTT. When a flow changes to a new path with a longer propagation delay, the increase in RTT will be interpreted as congestion instead of a rout change, leading to reduction in throughput. Before such a route change, when α is increased, the RTT should increase due to increased queueing delay. After such a route change, RTT will not increase because the queue is empty. Hence, if $$\frac{\Delta RTT}{\Delta \alpha}$$

is close to zero for multiple control intervals, it is then likely that a route change has occurred. In one embodiment, the system uses 1/G, where G is the throughput achieved by the flow, approximated by cwnd/minRTT, as the threshold for $$\frac{\Delta RTT}{\Delta \alpha}.$$

Algorithm of Route Change Detection

An embodiment of the invention includes an algorithm for detecting route changes. The parameters and variables for this embodiment include:

Parameter

RC_Threshold=10: the threshold for route change detection. If $$\frac{\Delta RTT}{\Delta \alpha}$$

is smaller than 1/G for RC_Threshold sequential control intervals (each interval has a length of T), the algorithm detects a route change event.

Variables minRTT: the minimum of all RTT observed in the last window of packets. This is an input variable from the congestion control algorithm.

cwnd: the congestion window of the last window of packets. This is an input variable from the congestion control algorithm.

rc_count: the counter of number of sequential intervals where $$\frac{\Delta RTT}{\Delta \alpha}$$

is smaller than 1/G.

last_rtt: the minRTT in the first interval of the current sequential intervals where $$\frac{\Delta RTT}{\Delta \alpha}$$

is smaller than 1/G.

last_alpha: the alpha value in the first interval of the current sequential intervals where $$\frac{\Delta RTT}{\Delta \alpha}$$

is smaller than 1/G.

Figure 8:
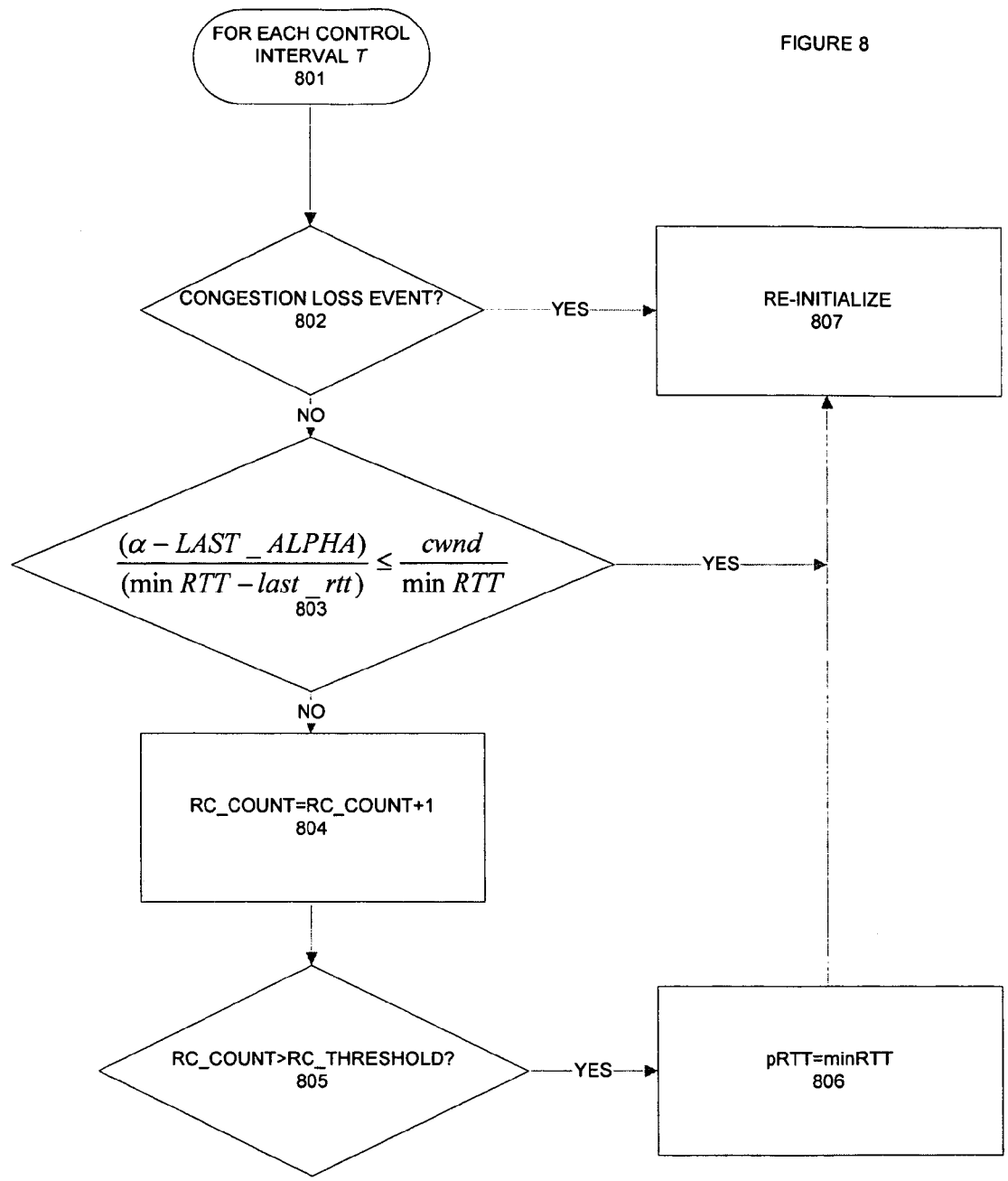
FIG. 8 is a flow diagram of an embodiment of route change detection in the invention.

FIG. 8 is a flow diagram of an embodiment of route change detection in the invention. Initialization sets rc_count=0, last_rtt=minRTT, and last_alpha=α. For each control interval T (step 801) determine if there is a congestion loss event (step 802). If so, re-initialize at step 807. If not, at step 803 determine if ((α-last_alpha)/(minRTT-lasts_RTT))≦(cwnd/minRTT). If yes, re-initialize at step 807. If not, then increment the rc_count (e.g. increment by 1) at step 804. At step 805 check to see if the rc_count exceeds rc_threshold. If so, set pRTT equal to minRTT at step 806 and re-initialize at step 807.

Randomized α Tuning

Figure 3:
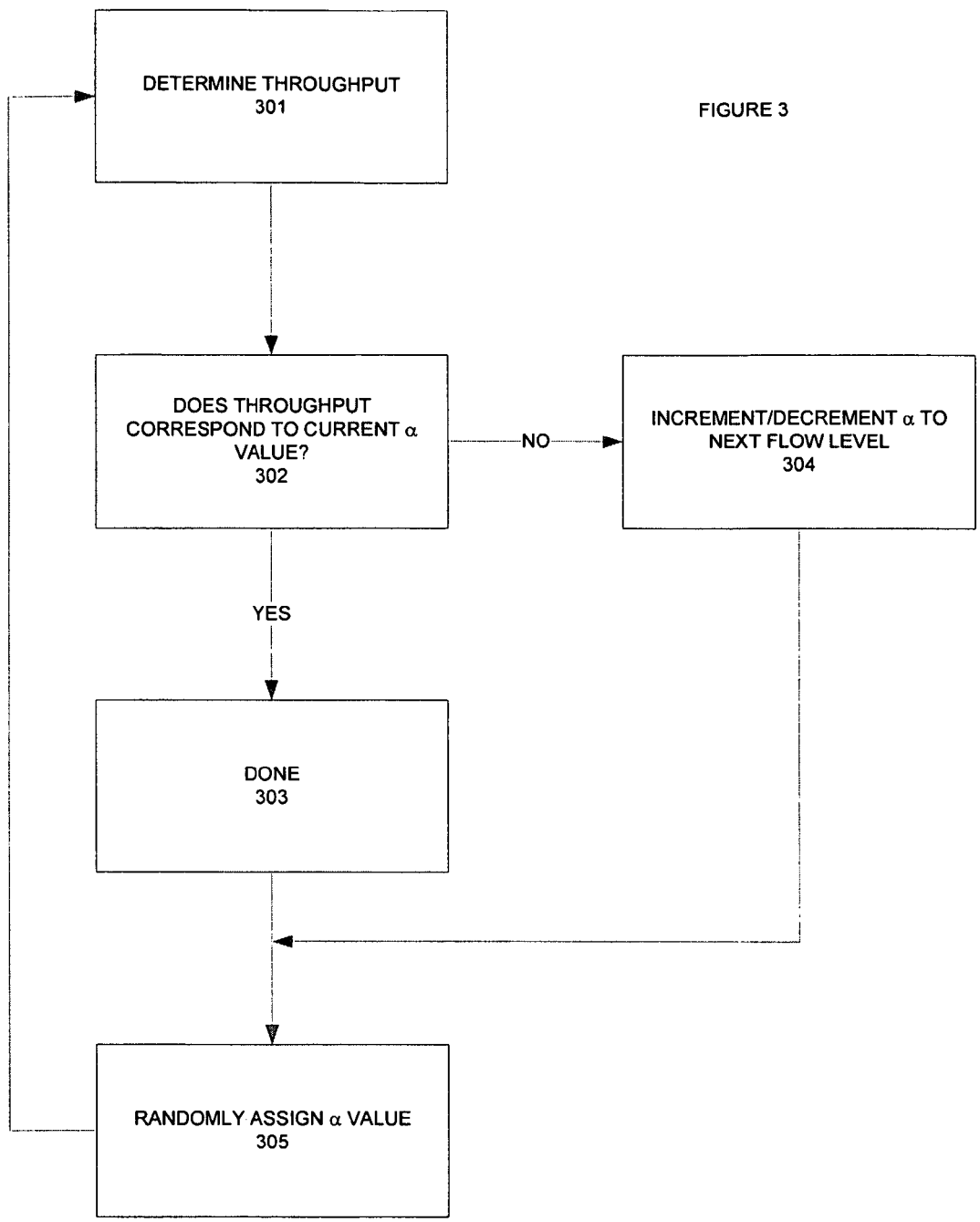
FIG. 3 is a flow diagram illustrating an embodiment of randomized α tuning.

The advantage of adaptive α tuning is its flexibility. One disadvantage is that AIMD always fills the queue on a slow timescale. A complementary technique is to randomize the selection of a among a pre-determined set of values. This technique does not fill the queue if the buffer is large enough, but fairness is harder to control. Randomization is used to achieve fairness statistically in the long run and is described in FIG. 3.

For instance, three values of α=8, 20, 200 packets are chosen for paths that are around 10 Mbps, 100 Mbps, and 1 Gbps, respectively. If a flow attains a throughput (step 301) over the last update interval that is different from the throughput region corresponding to its current α value (step 302), it increases or decreases its α value to the next level (step 304). Otherwise the α value remains the same (step 303). For example, when α=200 packets and the attained throughput is 9 Mbps, then α is decrease to the next level of α=20 packets.

To prevent flows with large a values to monopolize the resources to the detriment of flows with small α values, each flow, on a large timescale, randomly and independently initializes its α value (step 305), and applies the above algorithm to reshuffle its α value.

Equation-Based Alpha Tuning

A goal of equation-based alpha tuning in Delay Based TCP is to equalize two congestion feedback values, namely, end-to-end queueing delay q and loss probability p, in the form of driving a function of q and p to a pre-determined target, e.g. driving q/p/K a constant in equilibrium. Since loss probability may be difficult to accurately capture, in one embodiment, a ring buffer of size S is used to maintain the loss history. The system looks at the last S intervals and determines the total number of packets lost in S intervals and divide it by the total number of packets sent in S intervals. This value represents the loss probability and is used as p.

In many situations, a Delay Based TCP will be used on networks concurrently with loss based congestion control protocols (e.g. Reno). The invention selects K in such a way that both delayed based protocols and loss based protocols have reasonable throughput. The value K can be calculated offline based on a large set of experimental data. Examples of a K value that may be used with the invention is 10.

Figure 9:
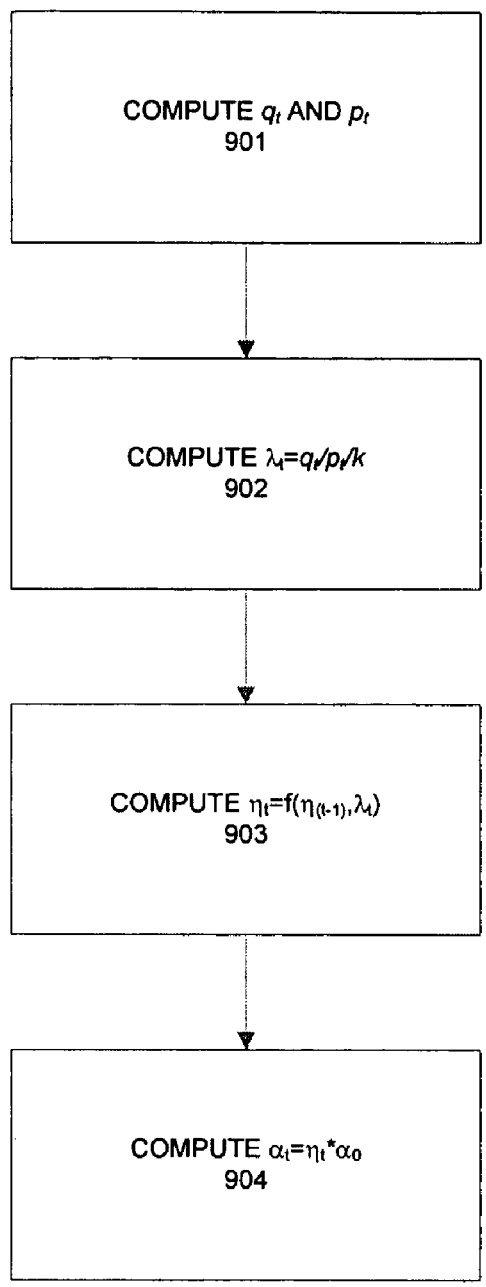
FIG. 9 is a flow diagram of an embodiment of alpha tuning in the invention.

The alpha tuning algorithm may be implemented only at each Delay Based TCP sender in one embodiment, and it iteratively computes the equilibrium q and p, and drives the ratio q/p towards K carefully, by dynamically updating the alpha parameter in the Delay Based TCP congestion control algorithm, without causing instability to its own throughput as well as the overall system. The alpha tuning algorithm is activated when there are packet losses, hence producing a non-zero loss probability. In a well provisioned network with all Delay Based TCP flows, as long as there is enough buffering to accommodate the sum of the alphas, alpha tuning will not be activated, and the equilibrium is the same as the case without alpha tuning. The algorithm is illustrated in FIG. 9. The initial conditions are $\eta_0=1$ and the initial α value is alpha_0. Periodically at time t, at step 901 compute $q_t$ and $p_t$. At step 902 compute $\lambda_t = q_t/p_t/k$ (when $p_t$ is non-zero). At step 903 compute $\eta_t = f(\eta_{(t-1)}, \lambda_t)$. At step 904 compute a new alpha value $\alpha_t = \eta_t * \alpha_0$. As $\lambda_t$ increases the new $\alpha_t$ value will increase. Similarly, as $\lambda_t$ decreases, the new $\alpha_t$ value will decrease. $\lambda_t$ can theoretically vary from 0 to infinity but its actual range depends on the initial value of α and the upper and lower bounds of α.

The function f computes a new average $\eta_t$ based on its current value $\eta_{(t-1)}$ and λ. Any reasonable exponential moving averaging function may be used for f.

In one embodiment, it may not be possible or desirable to execute floating point operations. Therefore, floating point operations are approximated by using integers having limited precision. The larger the integer data type, the more accurate the floating point approximation. The invention may be practiced with floating point operation.

To prevent sudden large increases in alpha, we place constraints on the growth of alpha based on the current alpha value, such as described in the AIMD scheme above. As noted with other embodiments described herein, a lower threshold of alpha may be established below which alpha will not go.

One-way Queueing Delay Measurement

In the delay-based scheme described above, delay measurements are made based on round trip delay (RTT). This results in delay from both the forward path and the backward path being incorporated in determining queueing delay and applying congestion control corrective measures. If the RTT delay is high, congestion is assumed and the packet rate is reduced. This may not be desirable in some cases. For example, if the forward path is not congested, but the return path is congested, the RTT delay will suggest congestion and the forward path will be reduced even though it doesn't need to be reduced. It would be more appropriate to ignore the reverse path congestion because the forward and the reverse paths may not be symmetrical in their respective delays. The invention provides a method of measuring and subtracting backward queueing delay so that only forward delay is used in changing congestion window size to reach equilibrium.

To be immune against congestion on the backward path, an embodiment of the invention includes a technique to measure the queueing delay on the backward path and subtract it from the RTT measurement to obtain the forward queueing delay, which is then used to determine the window size. In one embodiment, timestamps are put on the packet at the sender TCP engine when the packet is sent and at the receiver TCP engine when it is received. The difference between these timestamps represents the forward path delay. A difficulty arises because the sender and receiver clocks are not synchronized and may use different clock periods to generate their timestamps.

Backward Queuing Delay Measurement

The backward queuing delay (BQD) measurement algorithm requires the sender to have a clock of period $p_1$, and the receiver to have a clock of period $p_2$, such that $p_1 \leq p_2$. The $p_2$ clock is fixed by the receiver's RFC1323 timestamp period, and the sender period $p_1$ is only limited by the sender's ability to measure time. The following algorithm provides a method of measuring BQD up to within one source clock period $p_1$. Accurate measurements are made at rate of $1/p_2$. While the algorithm permits both end-host clocks to be desynchronized, the phase should be stable for accurate measurement. In one embodiment we assume that $p_2$ is known, and in another embodiment we present a method for estimating $p_2$.

Receiver Clock Period Known

Figure 4:
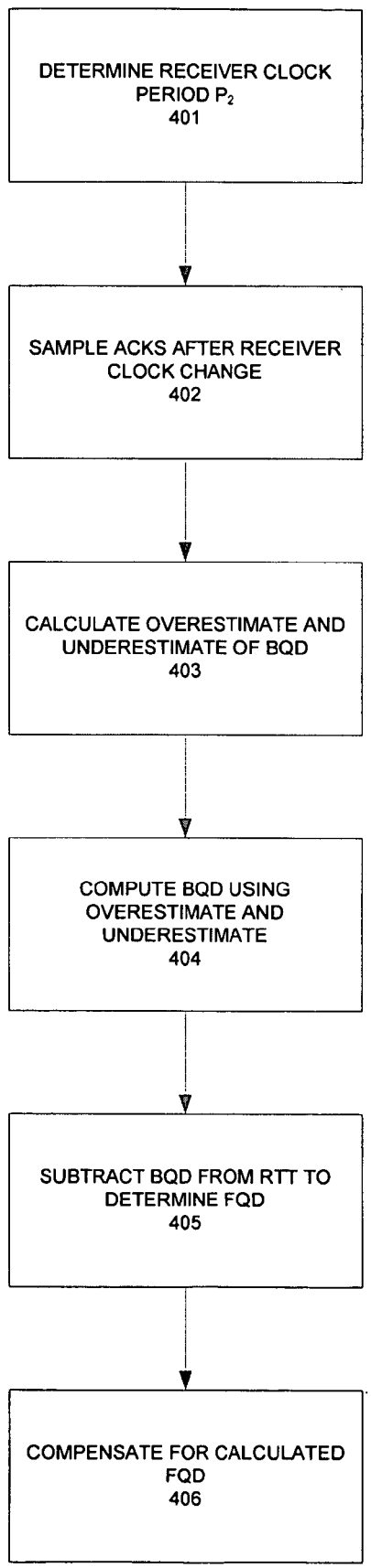
FIG. 4 is a flow diagram illustrating an embodiment of BQD calculation.

FIG. 4 is a flow diagram illustrating an embodiment for computing BQD when the receiver clock period is known. At step 401 the receiver clock period $p_2$ is determined. At step 402 sample ACKS are taken after receiver clock changes. An overestimate and underestimate of BQD is calculated at step 403. At step 404 the BQD is determined using the overestimate and underestimate generated instep 403. At step 405 BQD is subtracted from the total queueing delay to generate the forward queueing delay FQD. At step 406 FQD is used to compute a congestion control response as appropriate.

Figure 5A:
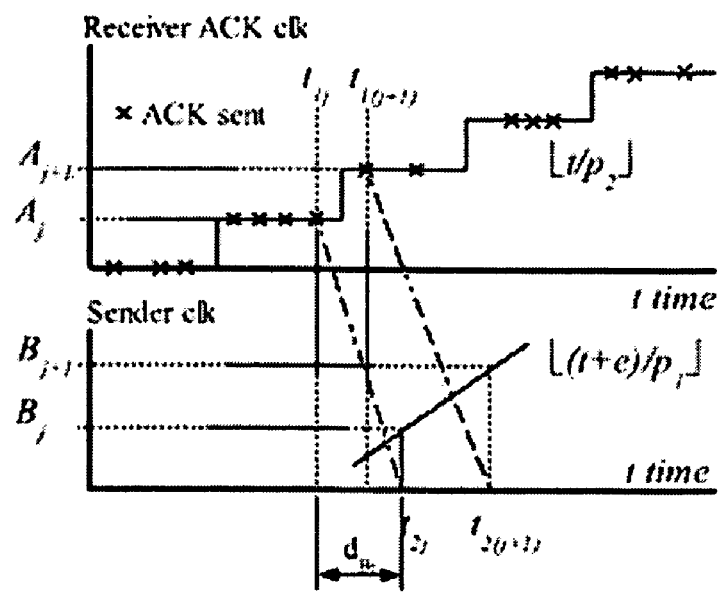
FIG. 5A is a timing diagram illustrating receiver and sender clock values at ACK send and receive time.

FIG. 5A illustrates some of the timing relationships of the receiver and sender clock signals referred to in the description below. The total backward path delay for the $j^{th}$ transmitted packet is the sum of backward propagation delay $d_{BP}$ and backward queuing delay $d_{BQj}$ $$d_{Bj} = d_{BP} + d_{BQj} \tag{1}$$

Let $t_{0j}$ be the transmission time of packet j. The $j^{th}$ outgoing packet is received at the destination host at time $t_{1j}$ and the receiver immediately sends an ACK which arrives at the sender at time $t_{2j}$. The acknowledgment for the $k^{th}$ received packet has a timestamp value of $$A_k = \left\lfloor \frac{t_{1k}}{p_2} \right\rfloor \tag{2}$$

When the $j^{th}$ acknowledgment arrives, the sender's clock has the value of $$B_j = \left\lfloor \frac{t_{1j} + d_{Bj} + e}{p_1} \right\rfloor \tag{3}$$

where e is the inherent offset between the two end-hosts' timestamp clocks. Let us define the difference between the two time measurements with information from packets j and k as $$C_{Bjk} = B_j - \frac{p_2}{p_1} A_k \tag{4}$$

which expands to $$C_{Bjk} = \left\lfloor \frac{\hat{t}_{1j} + d_{Bj} + e}{p_1} \right\rfloor + \left\lfloor \frac{t_{1j}}{p_1} \right\rfloor - \frac{p_2}{p_1} \left\lfloor \frac{t_{1k}}{p_2} \right\rfloor \tag{5}$$

where $t_{1j} = \mathrm{mod}(t_{1j}, p_1)$

We can estimate the propagation delay and offset between receiver and sender clocks using equation (5) by choosing the packets j and k appropriately to eliminate as many other terms as possible. Let us assume $p_2/p_1$ is an integer. When $k=j$, $C_{Bjk}$ is computed using the arrival time and receiver timestamp belonging to the same packet and (5) simplifies to $$C_{Bkk} = \left\lfloor \frac{\hat{t}_{1k} + d_{Bk} + e}{p_1} \right\rfloor + \left\lfloor \frac{\mathrm{mod}(t_{1k}, p_2)}{p_1} \right\rfloor \tag{6}$$

Note that the last term can be minimized when k is chosen to be the first acknowledgment sent after the increase of the receiver clock (step 402). Let $\underline{C}_{Bk}$ be the minimum of all $C_{Bkk}$ measurements at the time of the arrival of the $k^{th}$ packet's acknowledgment $$\underline{C}_{Bk} = C_{Bkk} \leq C_{Bii} \; i \leq k \tag{7}$$

Note that the condition for sampling exactly the lower bound for $\underline{C}_{Bk}$ is that the acknowledgement is sent at the time of the receiver clock increase and there is no backward queuing delay and $\mathrm{mod}(d_{Bk}+e, p_1)+\hat{t}_{1k}<p_1$. The value is bounded by the minimum $$\underline{C}_{Bk} \geq \left\lfloor \frac{d_{BP} + e}{p_1} \right\rfloor \tag{8}$$

which includes only the clock offset and backward propagation delay. Let us assume that we have indeed sampled the minimum of $C_{Bkk}$. Using (6) and (8) the over-estimate of BQD can be constructed if we choose k to be the first packet after the receiver clock increase, where $A_k = A_{k-1}+1$, $$\overline{D}_{BQk} = C_{Bkk} - \underline{C}_{Bk} \tag{9}$$

If $p_1$ is small then $\overline{D}_{BQk}$ is approximately $$\overline{D}_{BQk} \approx d_{BQk} + \left\lfloor \frac{\mathrm{mod}(t_{1k}, p_2)}{p_1} \right\rfloor \tag{10}$$

and the error introduced by the second term will always lead to an over-estimate.

To obtain an under-estimate (step 403) of BQD let us choose j to be the last acknowledgment sent in period $A_j$ and k be the first acknowledgment in the next period $A_k$, that is k=j+1 and $A_k=A_j+1$. In this case (5) simplifies to $$C_{Bjk} = \left\lfloor \frac{\hat{t}_{1j} + d_{Bj} + e}{p_1} \right\rfloor + \left\lfloor \frac{\text{mod}(t_{1j}, p_2)}{p_1} \right\rfloor - \frac{p_2}{p_1} \quad (11)$$

Note that by choosing the last acknowledgment we minimize the error caused by the last two terms. We can write the under-estimate of BQD as $$\underline{D}_{BQk} = C_{Bjk} - \underline{C}_{Bk} \quad (12)$$

where k=j+1 and $A_k=A_j+1$. Again, if $p_1$ is small, then $\underline{D}_{BQk}$ is approximately $$\underline{D}_{BQk} \approx d_{BQk} + \left\lfloor \frac{\text{mod}(t_{1k}, p_2)}{p_1} \right\rfloor - \frac{p_2}{p_1} \quad (13)$$

and the error introduced by the last terms leads to an under-estimate.

Note that if the minimum 8 is sampled and the gap between the last acknowledgement before and first acknowledgement after the receiver clock increase is small, $t_{1j}-t_{1k} \to 0$, and the sender clock period is small, $p_1 \to 0$, then the under and over-estimates approach the backward queuing delay $$\underline{D}_{BQk} \to d_{BQk} \quad (14)$$

$$\overline{D}_{BQk} \to d_{BQk} \quad (15)$$

A single BQD estimate can be computed (step 404) in a number of different ways from the under and over-estimates. One embodiment is a method that is robust to different ACK spacing. Note that the under and over-estimates can vary depending on the send time of the ACKs. If there is no ACK for some time after the receiver clock increase, then the over-estimate may have an error, and similarly if the last ACK before the increase is not soon before the increase, the under-estimate may have an error. In an environment where ACK spacing is not reliable, we can estimate the BQD to be a value that fits the tightest bound of several under and over-estimates. Such a BQD estimate $\hat{D}_{BQk}$ is $$\hat{D}_{BQk} = \begin{cases} \overline{D}_{BQ(k)} \cdot \text{if} \cdot \hat{D}_{BQ(k-1)} > \overline{D}_{BQ(k)} \\ \underline{D}_{BQ(k)} \cdot \text{if} \cdot \hat{D}_{BQ(k-1)} < \underline{D}_{BQ(k)} \\ \hat{D}_{BQ(k-1)} \cdot \text{otherwise} \end{cases}$$

Receiver Clock Period Estimation—Single Period Sample

The invention includes embodiments for determining $p_2$ from a single sample of the receiver clock period. This method may be too inaccurate for determining $p_2$ for BQD measurement. However, it may be used to determine the magnitude of $p_2$ and then select an estimate from a table of known conservative estimates that is compatible with all of the operating systems that use that period.

Figure 5B:
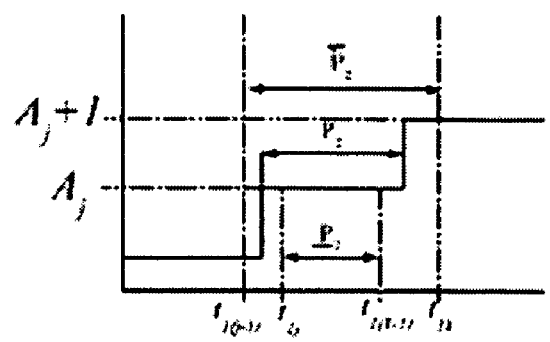
FIG. 5B is a timing diagram illustrating upper and lower bounds of a receiver clock period from samples.

As shown in the timing diagram of FIG. 5B, if the send time of the ACK is known before and after a receiver clock increase, $t_{1(j-1)}$ and $t_{1j}$ respectively, and the send time of the ACK before and after the next clock increase, $t_{1(k-1)}$ and $t_{1k}$ respectively, then the lower and upper bounds of the receiver clock period can be computed. In this embodiment, the sender does not know the ACK send time, but only $t_{2j}$, the jth packet's ACK arrival time, where $t_{2j}=t_{1j}+d_{Bj}$. Therefore, if we use the ACK arrival time to estimate the clock period, then changes in queuing delay also add noise to the period bound estimates. Using ACK arrivals before and after the clock increases, we can compute the estimate of the period lower-bound $$\underline{p}_{2k} = t_{2(k-1)} - t_{2j} = t_{1(k-1)} - t_{1j} + (d_{BQ(k-1)} - d_{BQj}) \quad (17)$$

and upper bound $$\overline{p}_{2k} = t_{2(k)} - t_{2(j-1)} = t_{1(k)} - t_{1(j-1)} + (d_{BQk} - d_{BQ(j-1)}) \quad (18)$$

Therefore our knowledge of the receiver clock from measurement of a single period may be limited both by the spacing of ACK packets as well as the difference in queuing delay that each ACK experiences.

Receiver Clock Period Estimation Averaging Multiple Samples

We can address the accuracy issues of single sample techniques by averaging the clock period measurements over multiple periods. Define an averaging operator that is used to construct the period estimate $$E_{(s,e)}(X(j)) = \frac{1}{N_{(s,e)}} \sum_{\{z \mid s < t_{2z} \le e\}} X_z \quad t_{2j} \le e \quad (19)$$

where X(j) is the set of all samples up to time $t_{2j}$, with sample $X_t$ being taken at time $t_2$, and $N_{(s,e)}$ is the number of samples within the period s<$t_{2j}$≤e. Let $t_2$ (j) be the set of all ACK arrival times at the time of the arrival of the $j^{th}$ ACK, and let A(j) be the set of all receiver timestamps associated with each ACK arrival in $t_2$(j).

One possible way to estimate the receiver period is to divide the time from the start of the connection and the most recent packet into two regions, and compute the mean increase of the sender clock relative to the mean increase of the receiver clock between these two regions $$\hat{p}_{2j} = \frac{E_{(t_{2j}/2, t_{2j})}(t_2(j)) - E_{(0, t_{2j}/2)}(t_2(j))}{E_{(t_{2j}/2, t_{2j})}(A(j)) - E_{(0, t_{2j}/2)}(A(j))} \quad (20)$$

If we let $\phi_j=\text{mod}(t_{1j}, p_2)$ then we can split (18) into $p_2$ plus an error term due to ACK inter-transmission time and an error term due to changes in queuing delay $$\hat{p}_{2j} = p_2 + r(0, t_{2j}/2, t_{2j}, t_{1j}) + e(0, t_{2j}/2, t_{2j}/2, t_{1j}) \quad (21)$$

where $$r(s1, e1, s2, e2) = \frac{E_{(s2,e2)}(\phi(j)) - E_{(s1,e1)}(\phi(j))}{E_{(s2,e2)}(A(j)) - E_{(s1,e1)}(A(j))} \quad (22)$$

and $$e(s1, e1, s2, e2) = \frac{E_{(s2,e2)}(d_{BQ}(j)) - E_{(s1,e1)}(d_{BQ}(j))}{E_{(s2,e2)}(A(j)) - E_{(s1,e1)}(A(j))} \quad (23)$$

If the maximum backward queuing delay is $d_{BQmax}$, then note that in (22) and (23) the numerator is bounded by $p_2$ and $d_{BQmax}$ respectively. Therefore as $t_{1j} \to \infty$, $r(0, t_{2j}/2, t_{2j}/2, t_{1j}) \to 0$ and $e(0, t_{2j}/2, t_{2j}/2, t_{1j}) \to 0$ and $\hat{p}_{2j} \to p_2$. This means $\hat{p}_{2j}$ eventually converges to $p_2$ regardless of the ACK transmit time distribution or queuing delay changes.

Over a finite estimation period, consider the worst case error in the period estimate. The lower and upper bounds of the period estimate can be computed. The largest positive period error occurs when a region of maximum queue size and maximum φ is followed by a region of minimum queue size with φ=0. The period estimate upper-bound is $$\bar{p}_{2j} = p_2 + \frac{d_{BQ\,max} + p_2}{E_{(s2,e2)}(A(j)) - E_{(s1,e1)}(A(j))} \quad (24)$$

The largest negative period error occurs when a region of minimum queue size with φ=0 is followed by a region of maximum queue size with maximum φ. The period lower-bound is $$\hat{p}_{2j} = p_2 - \frac{d_{BQ\,max} + p_2}{E_{(s2,e2)}(A(j)) - E_{(s1,e1)}(A(j))} \quad (25)$$

The estimate errors due to the r (s1, e1, s2, e2) term can be reduced by selecting only the first packet after a receiver clock increase, so that the set of samples A(j) and $t_2$ (j) only contain packets such that $A_j = A_{j-1} + 1$. Estimate errors due to the e(s1, e1, s2, e2) term can also be reduced if information about queuing delay differences between the two regions is available.

Delay Based TCP with BQD Detection

Once BQD is determined, it can be incorporated into a Delay Based TCP algorithm. Recall that the Delay Based TCP window control law for qdelay>0 and $$\gamma = \frac{1}{2}$$

is $$w \leftarrow \frac{1}{2}\left(w\frac{baseRTT}{RTT} + \alpha + w\right) \quad (26)$$

In equilibrium (26) gives $$\frac{w}{RTT}(RTT - baseRTT) = \alpha \quad (27)$$

which suggests that the equilibrium source rate depends both on α and the forward and backward queue $$X(D_{BQ} + D_{FQ}) = \alpha \quad (28)$$

We integrated the BQD measurement into the Delay Based TCP control law by adding the BQD estimate to the baseRTT estimate, such that baseRTT' =baseRTT+$D_{BQ}$. By using baseRTT' instead of baseRTT this equilibrium property may be altered so that the source rate no longer depends on the backward queue and $$X\,D_{FQ} = \alpha \quad (29)$$

Thus, only forward queuing delay is used to determine window and alpha adjustments for congestion control.

We claim:

1. A method of controlling congestion when transmitting information from a sender to a receiver over a network, comprising:
   at a transmission device:
      transmitting N flows over the network, wherein N is an integer number of flows that varies over time;
      establishing a minimum queuing delay $q_0$, wherein the minimum queuing delay $q_0$ is independent from the number of flows, N;
      determining a packet parameter α value, wherein the packet parameter α value corresponds to a number of data packets maintained in buffers of the network for each of the N flows; and
      controlling the transmission of the N flows in accordance with a network buffering requirement of $q_0$+Nα, wherein the network buffering requirement corresponds to a total number of packets buffered in the network.

2. The method of claim 1,
   wherein controlling the transmission of the N flows includes establishing a congestion window in accordance with $q_0$ and α for limiting data transmissions over the network by the transmission device.

3. The method of claim 1, further including:
   determining whether a loss of data packets has occurred; and
   in response to determining that a loss of data packets has occurred, decreasing the packet parameter α to a predetermined fraction of a previous value of the packet parameter α; and
   in response to determining that a loss of data packets has not occurred, increasing the packet parameter α by a predetermined amount.

4. The method of claim 1, further including:
   storing, in memory associated with the transmission device, a plurality of predetermined packet parameter α values;
   selecting a one of the plurality of predetermined packet parameter α values as the packet parameter α value for each of the N flows, wherein each of the N flows is associated with an ideal throughput value;
   measuring throughput achieved in each of the N flows;
   comparing the throughput achieved to the ideal throughput value; and
   resetting the packet parameter α value, wherein the packet parameter α value is increased when the throughput achieved is greater than the ideal throughput value and the packet parameter α value is decreased when the throughput achieved is less than the ideal throughput value.

5. The method of claim 1, wherein the packet parameter α value is selected using a predetermined function.

* * * * *